United States Patent [19]
Crawford et al.

[11] Patent Number: 5,978,063
[45] Date of Patent: *Nov. 2, 1999

[54] SMART SPACERS FOR ACTIVE MATRIX LIQUID CRYSTAL PROJECTION LIGHT VALVES

[75] Inventors: Gregory P. Crawford, Providence, R.I.; Jackson Ho, Palo Alto, Calif.

[73] Assignee: Xerox Corporation, Palo Alto, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/842,586

[22] Filed: Apr. 15, 1997

[51] Int. Cl.$^6$ .................................................. G02F 1/1339
[52] U.S. Cl. ........................... 349/155; 349/156; 349/157
[58] Field of Search .................................... 349/155, 156, 349/157

[56] References Cited

U.S. PATENT DOCUMENTS

| | | | |
|---|---|---|---|
| 3,863,332 | 2/1975 | Leupp et al. | 349/156 |
| 3,978,580 | 9/1976 | Leupp et al. | 349/156 |
| 4,685,770 | 8/1987 | Baeger | 349/155 |
| 4,712,875 | 12/1987 | Tsuboyama et al. | 349/155 |
| 4,763,995 | 8/1988 | Katigiri et al. | 349/156 |
| 4,775,225 | 10/1988 | Tsuboyama et al. | 349/155 |
| 4,983,429 | 1/1991 | Takayanagi et al. | 349/155 |
| 5,499,128 | 3/1996 | Hasegawa et al. | 349/155 |
| 5,707,785 | 1/1998 | Hsieh et al. | 349/156 |
| 5,739,882 | 4/1998 | Shimizu et al. | 349/155 |

OTHER PUBLICATIONS

"Improved Construction of Liquid Crystal Cells" by Maltese et al., Alta Frequenza, vol. XLVII, No. 9, pp. 664–667, Sep. 1978.

*Primary Examiner*—William L. Sikes
*Assistant Examiner*—Toan Ton
*Attorney, Agent, or Firm*—Oliff & Berridge, PLC

[57] ABSTRACT

A liquid crystal display is provided having two substrates. One substrate includes active aperture areas and a non-active area. A spacing layer is provided between the two substrates and includes spacing elements of anisotropic shape and geometry. The anisotropic spacing elements are formed only within the non-active areas of the substrate. A method of manufacturing is also provided including mechanically rubbing the liquid crystal display after the spacing elements are formed on the one substrate.

20 Claims, 8 Drawing Sheets

SMART SPACERS FOR ACTIVE MATRIX LIQUID CRYSTAL PROJECTION LIGHT VALVES

BACKGROUND OF THE INVENTION

1. Field of the Invention

This invention relates generally to displays and more particularly concerns an active matrix liquid crystal display cell in which smart spacers are provided having an anisotropic shape.

2. Description of Related Art

Active matrix liquid crystal displays (AM LCD) have a variety of uses including being used as the projection element in rear projection monitors. The AM LCD is generally constructed using a rear glass layer with an addressing element and pixel ITO electrodes, a liquid crystal layer, and a front glass layer with addressing elements and pixel ITO electrodes. The cell gap spacing between the front and rear glass layers should remain uniform for consistent light propagation through the AM LCD. Several conventional ways are known to assemble AM LCDs and achieve uniform cell gap spacing within desired tolerance levels.

FIG. 1 shows a cross-sectional view of a convention vacuum chuck or vacuum press method of assembling a liquid crystal display cell. In this method, a vacuum chuck 10 asserts a pressing force 24 upon a liquid crystal display cell. The liquid crystal display cell includes a bottom substrate 12, a top substrate 14, a seal 16 being an epoxy seal or other form of adhesive glue, liquid crystal material 18, and many randomly placed spacers 20. The spacers 20 are typically spherical glass beads or cylindrical micro-fibers and are randomly placed on the bottom substrate 12 using the techniques of the well known dry cloud method or the well known solvent dispersed method. Additionally, some spacers 20 are placed in the seal 16. The liquid crystal display cell is covered with saran wrap or flexible plastic sheet 22 and an ultraviolet light 26 cures the seal 16 while the pressing force 24 compresses the bottom substrate 12 and the top substrate 14 together.

FIG. 2 shows a conventional vacuum sealed plastic bag technique of assembling a liquid crystal display cell similar to the vacuum chuck or vacuum press method. The liquid crystal display cell includes a bottom substrate 12, a top substrate 14, a seal 16, liquid crystal material 18 and many randomly placed spacers 20. However, in this method, a vacuumed sealed plastic bag exerts the pressing force 24 on the liquid crystal display cell. The seal 16 is cured using either ultraviolet light or heat depending on the type of seal 16.

FIG. 3 shows a conventional balloon method of assembly a liquid crystal display cell. Again, the liquid crystal display cell includes a bottom substrate 12, a top substrate 14, a seal 16, liquid crystal material 18 and many randomly placed spacers 20. A balloon 30 and a thermal chuck hot plate 32 exert the pressing force 24 and cure the seal 16. The seal 16 is therefore thermally cured. On the other hand, if an ultraviolet light cured seal is used then the thermal chuck hot plate 32 may be replaced with glass and the liquid crystal display cell may be back irradiated with the ultraviolet light.

FIG. 4 shows a top view of a liquid crystal display cell assembled using any one of the vacuum chuck method, the vacuum sealed plastic bag method or the balloon method. A nine pixel arrangement is shown merely for illustrative purposes even though the actual number of pixels will be much greater. The liquid crystal display cell is divided into an active aperture area 34 and a non-active area 36 with the spacers 20 randomly distributed throughout both the active aperture area 34 and the non-active area 36.

The above-described conventional methods produce liquid crystal display cells with uniform cell thicknesses having acceptable tolerances. However, problems tend to occur as the size of the active aperture area 34 diminishes. For example, in some projection displays the size of the active aperture area 34 may be of the same order of magnitude as the spacers 20. When the spacers 20 overlap or rest on the active aperture area 34, they may occupy approximately 15% of the active aperture area 34, which significantly disrupts the performance of the liquid crystal display cell and degrades the resulting image. Additionally, the spacers 20 disturb the liquid crystal profile around the spacers 20 which further degrades the resulting image, (i.e., reduces the brightness and contrast).

The randomly placed spacers 20 may not be merely removed to leave the spacers 20 in the seal 16 as shown in FIG. 5 because the pressing force 24 results in a bend in the top substrate 14 that distorts the entire liquid crystal display cell and results in unacceptable image quality.

"Improved Construction of Liquid Crystal Cells" by Maltese et al., Alta Frequenza, Vol. XLVII, No. 9, pages 664–667, September 1978, the subject matter of which is incorporated herein by reference, discloses large multiplexed liquid crystal panels having distributed small-area spacers between plates to make a stiff structure.

U.S. patent application Ser. No. 08/767,652, filed Dec. 17, 1996, the subject mater of which is incorporated herein by reference, discloses at least one method of applying spacer elements randomly on a bottom substrate and subsequently removing the spacing elements from active areas.

SUMMARY OF THE INVENTION

It is an object of the present invention to provide spacers that are hidden and occupy space only on non-active areas of the liquid crystal cell.

The spacers may also be engineered to be highly anisotropic in shape so as to be compatible with the aggressive mechanical rubbing process of the LCD assembly. The distribution and number of the spacers may also be precisely controlled.

The positioning of the spacers may be decided and controlled by a mask design using photolithography techniques. Further, the spacers may be very narrow so that their influence on the liquid crystal director-field can be contained in non-active areas to avoid projecting defect regions on the screen. Precise thickness control may be achieved using spin coating techniques or CVD technologies. The smart spacers may be fabricated on either the active matrix plate or on the cover plate.

Other objects, advantages and salient features of the invention will become apparent to one skilled in the art from reading the detailed description taken in conjunction with the annexed drawings which disclose preferred embodiments.

BRIEF DESCRIPTION OF THE DRAWINGS

The detailed description will be described with reference to the following drawings in which like reference numerals refer to like elements and wherein.

DETAILED DESCRIPTION OF PREFERRED EMBODIMENTS

Figure 1:
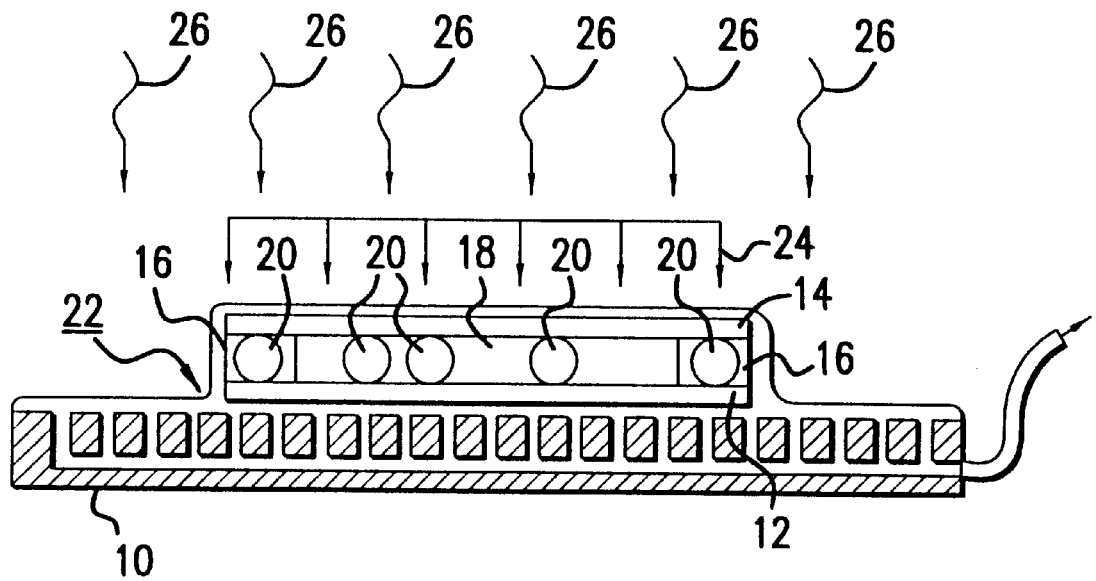
FIG. 1 shows a cross-sectional view of one method of assembling a liquid crystal display cell.
Figure 2:
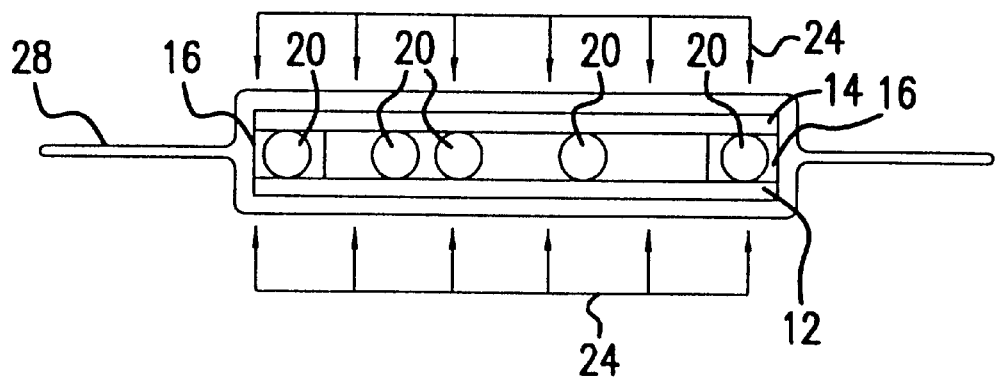
FIG. 2 shows a cross-sectional view of another method of assembling a liquid crystal display cell.
Figure 3:
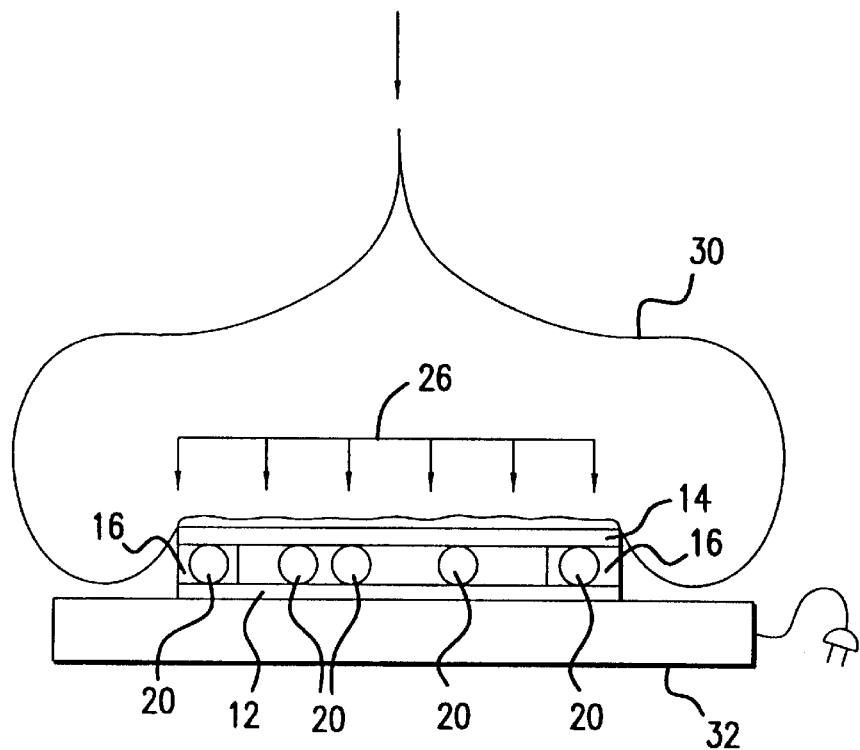
FIG. 3 shows a cross-sectional view of another method of assembling a liquid crystal display cell.
Figure 4:
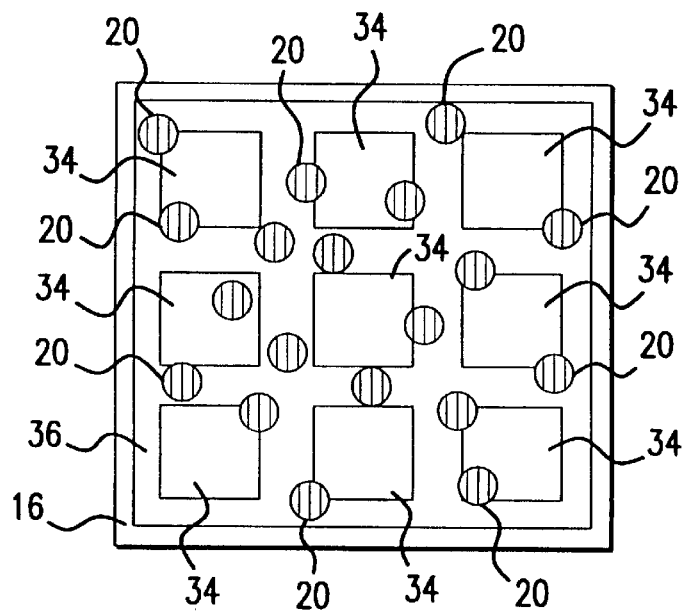
FIG. 4 shows a top view of a liquid crystal display cell assembled using one of the methods shown in FIGS. 1–3.
Figure 5:
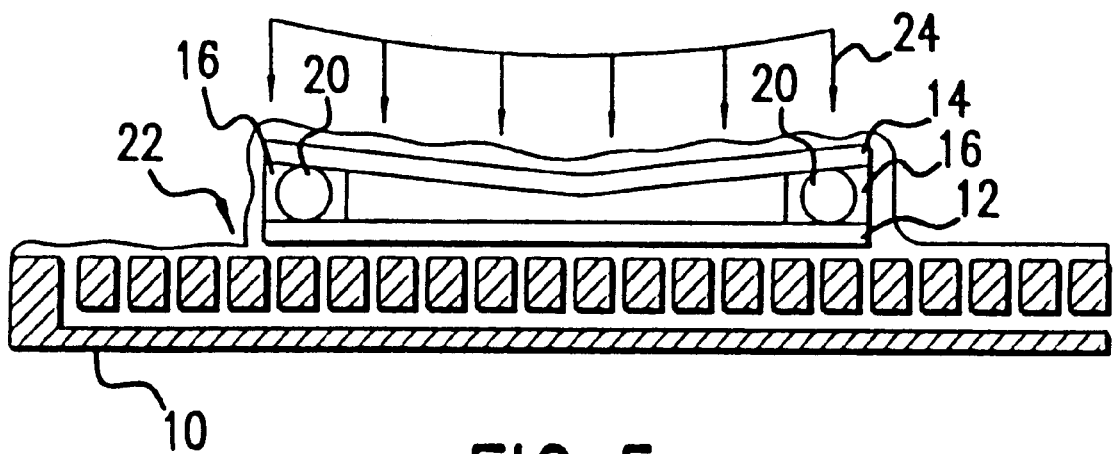
FIG. 5 shows a cross-sectional view of yet another method of assembling a liquid crystal display cell.
Figure 6:
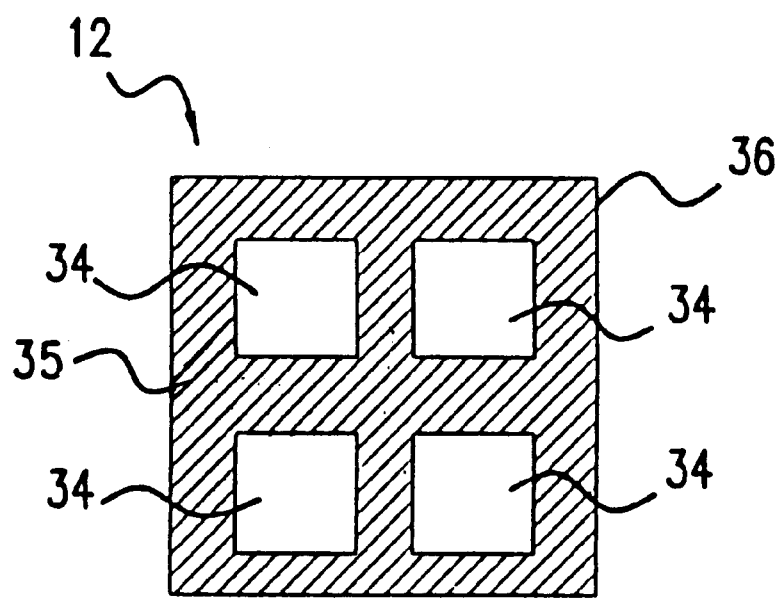
FIG. 6 shows a top view of a bottom substrate.

FIG. 6 shows a bottom substrate 12 of a liquid crystal display cell having a four pixel arrangement. The actual number of pixels is preferably much greater than that shown and accordingly the present invention includes a greater number of pixels. The present invention is not limited to only the assembly of liquid crystal display cells but is also applicable to the assembly of any display cell having a bottom substrate 12 and a top substrate 14 that should remain closely and uniformly spaced apart such as field emitting displays (FED's), electroluminesce, etc.

The bottom substrate 12 includes active aperture areas 34 and non-active areas 36. The non-active area 36 is opaque and preferably does not transmit light in the ultraviolet (UV) range. The bottom substrate 12 is preferably coated with a thin coating of negative photoresist or negative UV curable polyimide (also cured affixing layer 35). The thickness of the thin coating should be in the range of approximately 0.1 microns to 0.5 microns and should be at least 0.05 microns, but generally no more than 1 micron and preferably 0.2 microns. If the thin coating gets too thick it may cause filling problems and disturb the liquid crystal profile.

After coating the bottom substrate 12 with a thin coating of negative photoresist or negative UV curable polyimide, spacers are photolithographically formed in non-active areas 36 of the bottom substrate 12. Alternatively, the spacers 54 may be photolithographically formed from a deposited dielectric such as CVD oxide, nitride and/or oxy/nitride. The spacers of the present invention do not overlap into the active areas 34. As discussed below, the spacers are anisotropic in shape to withstand the LCD assembly processes including the mechanical rubbing. Their shape is also optimized to be outside of the active areas 34 so that the influence they have on the liquid crystal director-field is contained within the non-active area 36. The spacer distribution and count is precisely controlled based on a mask design for well known photolithography techniques as is well known to one skilled in the art.

Figure 7:
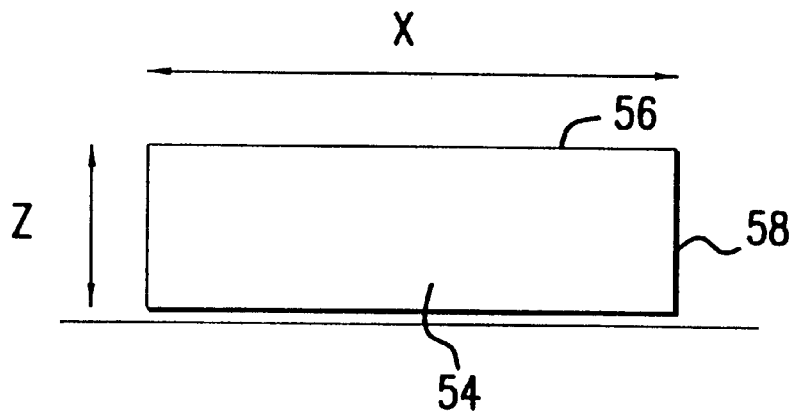
FIG. 7 shows a side view of one spacer of the present invention.

FIG. 7 shows a side view of a spacer 54 of the present invention that may be formed using a mask and the negative photoreactive polyimide. Spacer 54 is anisotropic in shape as it includes first side 56 along an X direction (also known as the long axis) and a second side 58 along a Y direction (not shown in FIG. 7). The anisotropic shape of spacer 54 refers to a longer side along the X direction compared to the shorter side along the Y direction. The spacer 54 is preferably 12 $\mu$m along the X direction and 4 $\mu$m along the Y direction. However, these dimensions are variable depending on the display pixel design. This enables the spacer 54 to withstand the mechanical rubbing process and to allow the positioning of the spacer 54 in the non-active areas 36 without interfering with the active areas 34. The positioning of the spacer 54 is decided by a mask design as is well known to one skilled in the art. By controlling the mask design, the spacer distribution and count may also be controlled. Further, the spacers 54 can be made of sufficient size that their influence in the liquid crystal director field can be contained in non-active areas 36 to avoid projecting defect regions onto the screen. The precise thickness of the spacer 54 in the Z direction can be achieved by spin coating techniques or CVD technology as is well known to one skilled in the art. Minimum display distances are typically required so the cell gap of Z-height is on the order of 5 $\mu$m for LC materials with an optical anisotrophy, $\Delta n$, of 0.09–0.1. The Z-height strongly depends on the $\Delta n$ of the LC being used.

Figure 8:
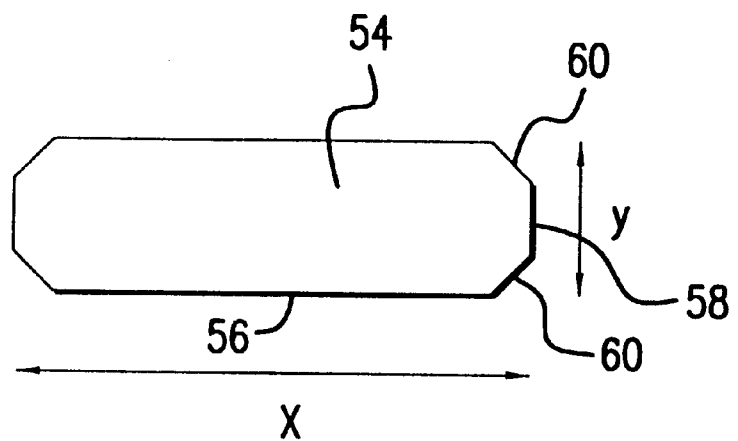
FIG. 8 shows a top view of one spacer according to the present invention.

FIG. 8 shows a top view of spacer 54 in which corner sides 60 are provided between each of the first sides 56 and second sides 58. This provides a shape that enables spacers 54 to withstand the rubbing process and control their influence in the liquid crystal director field. The corner sides 60 solve interference problems of the prior art caused by the closeness of the spacers with the active areas 34. Although not shown, the corner sides 60 may also be rounded or curved.

Figure 9:
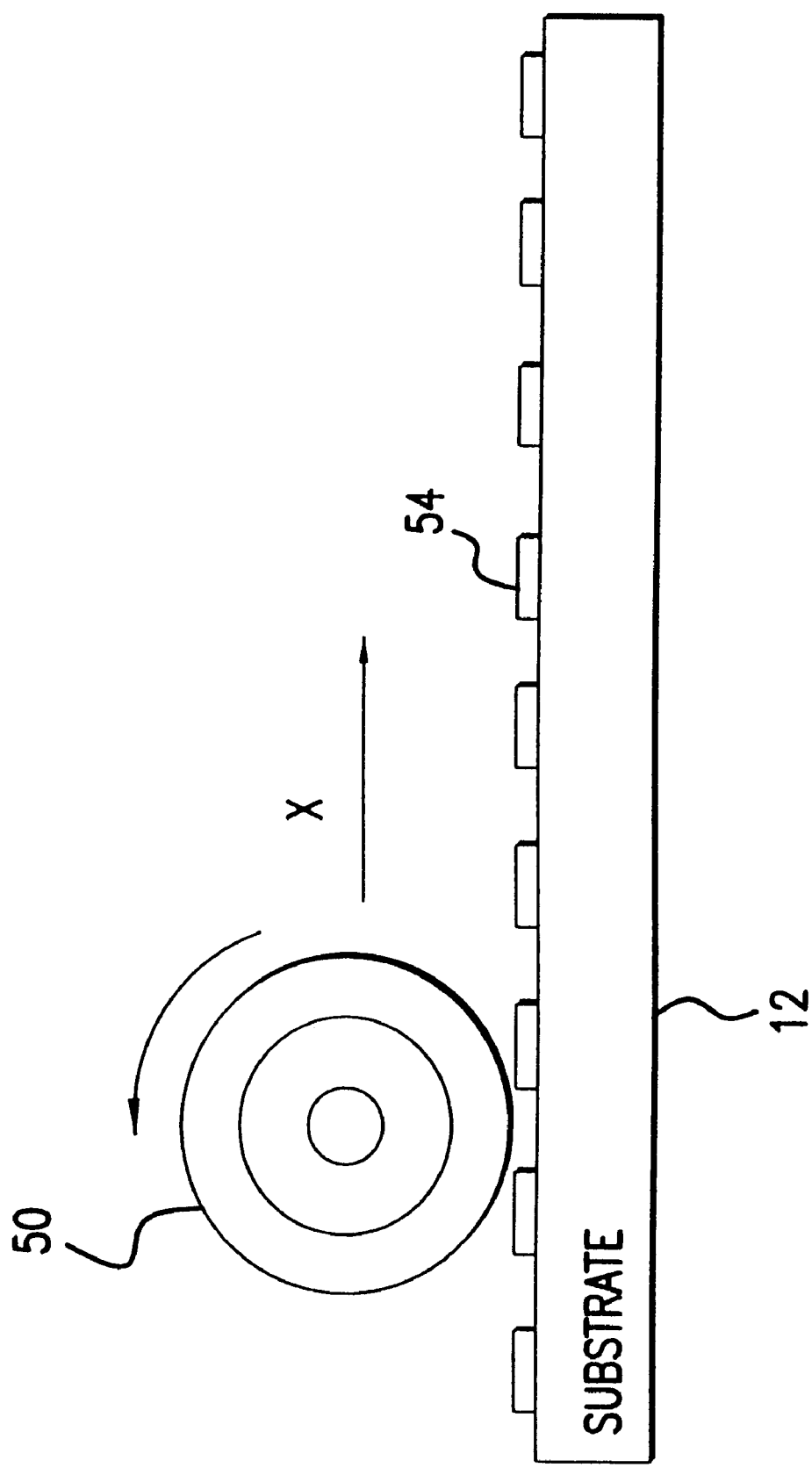
FIG. 9 shows a rubbing process according to the present invention.

FIG. 9 shows a conventional LCD rubbing process using a roller 50 that rolls along the X direction (long axis) of the spacers 54. Unlike prior art spacers, the spacers of the present invention withstand the rubbing process due to their anisotropic shape. Prior art spacers that are post-like are easily destroyed by the rubbing process. Subsequent to the rubbing process, the top substrate 14 may be applied in conventional ways to form the complete liquid crystal cell.

Figure 10A:
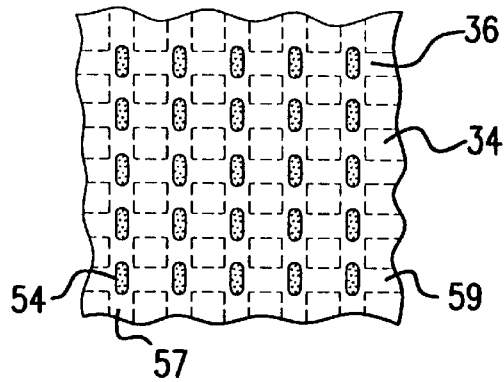
FIGS. 10a–10c show various placements of spacers.
Figure 10B:
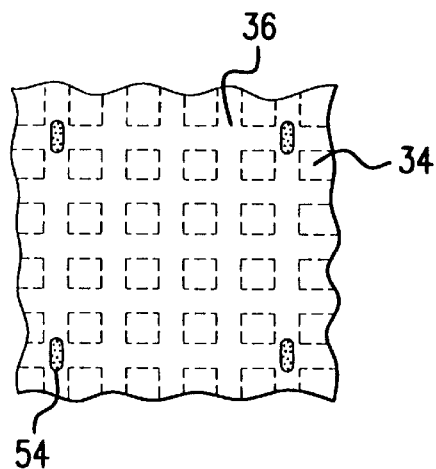
Figure 10C:
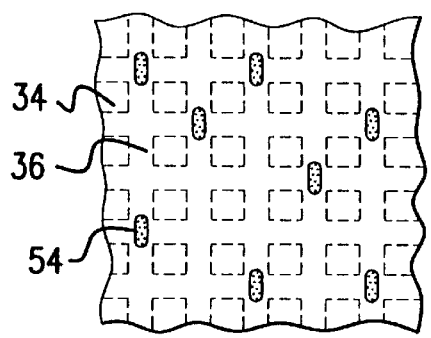

The spacers position depends on the mask design that is used to selectively position the spacers. As shown in FIG. 10a, spacers 54 may be placed at the intersection of the data lines 57 and the scan lines 59 of the LCD so that they are hidden from and therefore contained only in the non-active areas 36. Due to the anisotropic shape, the spacers 54 are not provided in the active areas 34. FIG. 10a shows an embodiment in which spacers 54 are provided at the intersection of each data line 57 and scan line 59. FIG. 10b shows an embodiment in which spacers 54 are provided at every fourth intersections. Finally, FIG. 10c shows an embodiment in which spacers 54 are randomly distributed throughout the substrate 12. Other mask designs provide spacers at every sixteen intersections or every thirty-two intersections. Again, the spacer distribution and count is precisely controlled based on the mask design. Ideally, the number of spacers 54 is minimized to ensure optimal optical performance.

Figure 11:
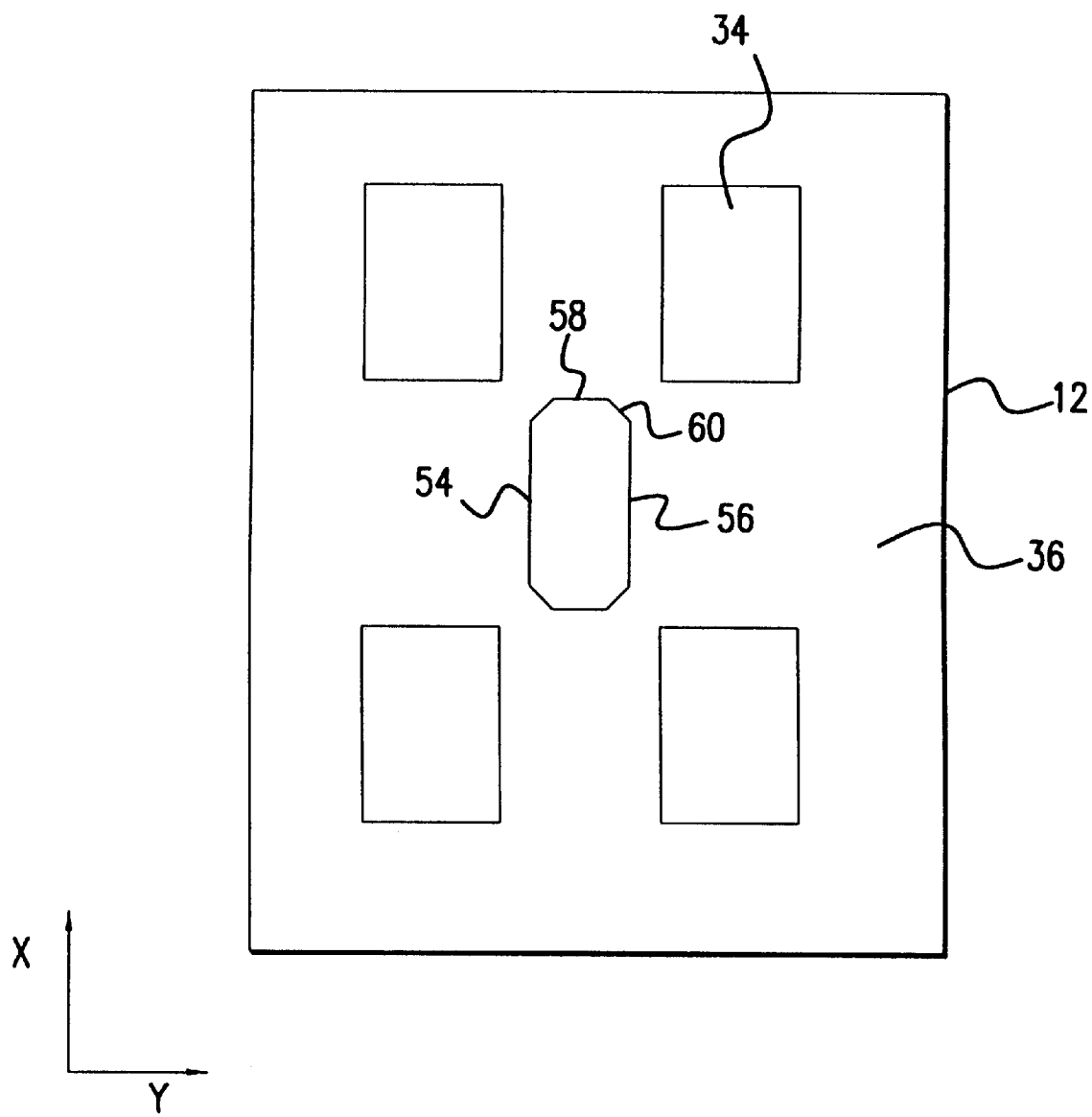
FIG. 11 shows a top view of one spacer on a substrate according to the present invention.

For ease of illustration and understanding, FIG. 11 shows four active areas 34 and one spacer element 54 provided within the intersection of the data line 57 and scan line 59. The spacer 54 includes both first sides 56 along the X direction (long axis), second sides 58 along the Y direction (short axis) and corner sides 60 between the first and second sides. The width of the spacer in the Y direction is preferably 3–5 micrometers. In such an embodiment, each respective corner side 60 is provided at least 1½ micrometers away from each active area 34.

Figure 12:
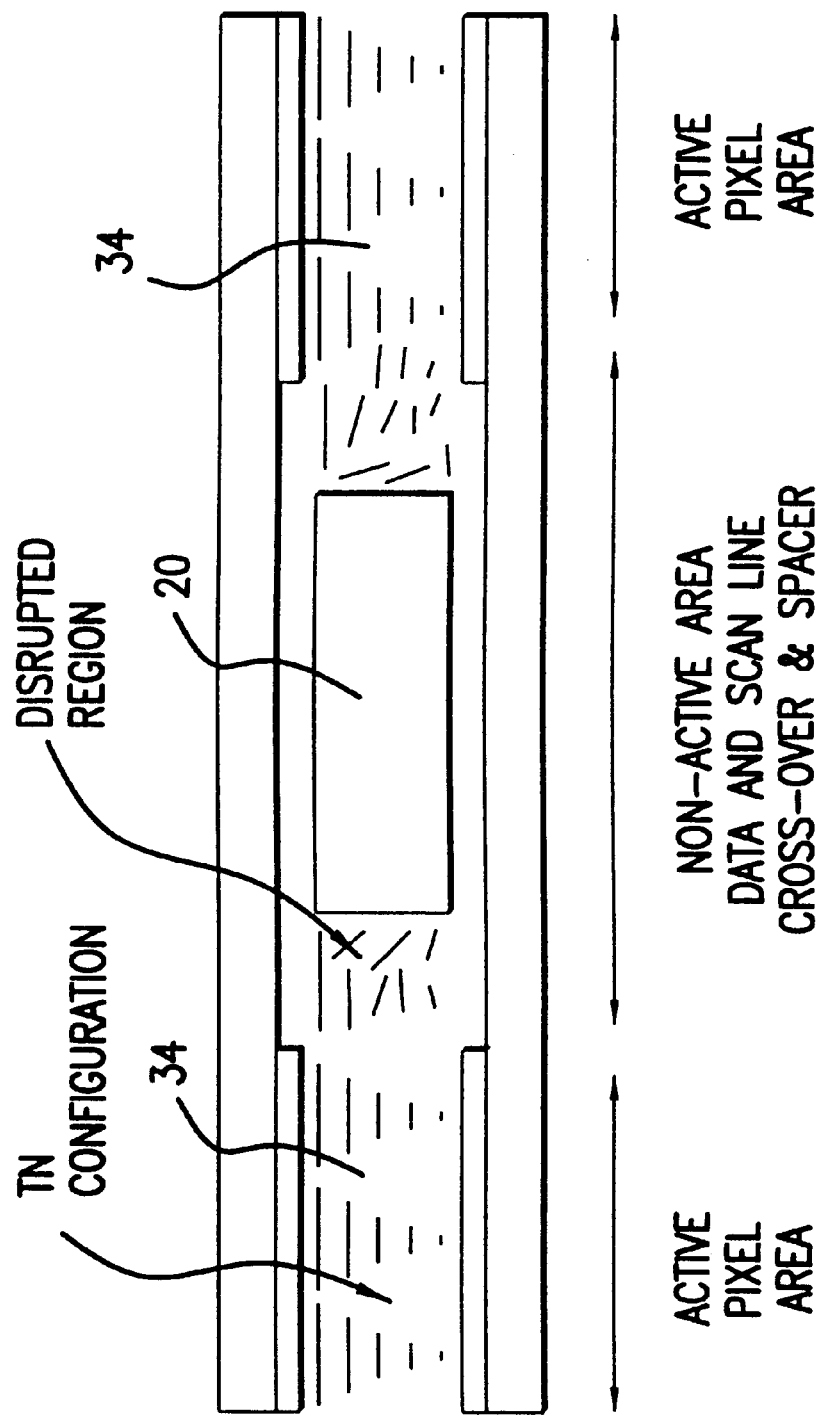
FIG. 12 shows a side view of a liquid crystal display cell with a conventional spacer showing a disrupted region.

This construction minimizes the effect of the spacer 54 on the nematic director field. For example, in conventional architectures, if the liquid crystal molecules come into contact with the spacer 20, the surface forces on the spacer 20 destruct the liquid crystal configuration away from its conventionally twisted form as shown in FIG. 12. In FIG. 12, part of the active areas 34 may include a disrupted region caused by the prior art spacer 20. Contrarily, the spacer 54 of the present invention is constructed to be narrow and anisotropic so that the liquid crystal director field has ample distance to maintain its optimal twisted form in the active pixel areas 34 and in addition is compatible with the LCD assembly process.

The above embodiments have been described with reference to the spacer 54 being fabricated onto the bottom substrate 12. However, the spacer 54 may also be fabricated onto the top surface 14.

While the above invention has been described with respect to the preferred embodiments, many modifications and variations are apparent from the description of the invention, and all such modifications and variations are intended to be within the scope of the present invention as defined in the appended claims.

What is claimed is:

1. A display cell comprising:
   two substrates with at least one of said two substrates divided into an active aperture area and a non-active area;
   a spacing layer, interposed between said two substrates, the spacing layer including an affixing layer and a plurality of spacing elements separate from one another, said spacing elements being anisotropic in shape, the affixing layer covering at least a portion of the non-active area and remaining substantially outside of the active aperture area, wherein said two substrates are affixed to each other after one of the two substrates and the plurality of spacing elements have been mechanically rubbed, the two substrates remaining substantially uniformly separated from each other by said spacing elements.

2. The display cell of claim 1, wherein the spacing elements are formed using a mask.

3. The display cell of claim 1, wherein the spacing elements are prevented from being formed within the active aperture area.

4. The display cell of claim 1, wherein the spacing elements extend along a first axis and along a second axis shorter than the first axis.

5. The display cell of claim 4, wherein one of the spacing elements is approximately 12 microns along the first axis and 4 microns along the second axis.

6. The display cell of claim 4, wherein the spacing elements are uniformly thick as measured along a third axis orthogonal to the first and second axes.

7. The display cell of claim 6, wherein one of the spacing elements is approximately 5 microns along the third axis.

8. The display cell of claim 1, wherein the display cell is a liquid crystal display cell and further comprises a liquid crystal layer interposed between said two substrates.

9. The display cell of claim 1, wherein the affixing layer comprising a negative photoresist.

10. The display cell of claim 1, wherein the affixing layer is from approximately 0.05 microns to approximately 1 micron thick.

11. A method of forming a display cell comprising:
    providing a first substrate which has been partitioned into an active aperture area and a non-active area and has a front surface and a rear surface;
    forming a plurality of spacing elements separate from one another on the front surface and non-active areas of said first substrate, the spacing elements being anisotropic in shape;
    mechanically rubbing over the first substrate having the plurality of spacing elements formed thereon; and
    attaching a second substrate on the front surface of said first substrate, said second substrate being kept at a substantially uniform distance from said first substrate by said spacing elements.

12. The method of claim 11, wherein the spacing elements extend along a first axis and along a second axis shorter than the first axis.

13. The method of claim 12, wherein one of the spacing elements is approximately 12 microns along the first axis and 4 microns along the second axis.

14. The method of claim 12, wherein the spacing elements are rubbed along the first axis.

15. The method of claim 14, wherein the mechanical rubbing controls a thickness of the spacing elements measured in a direction orthogonal to the first axis and the second axis.

16. The method of claim 15, where the thickness is approximately 5 microns.

17. The method of claim 11, wherein the forming step comprises photolithographically forming the spacing elements having the anisotropic shape using a mask.

18. The method of claim 11, wherein the display cell is a liquid crystal display cell and further comprises providing a liquid crystal layer interposed between said first and second substrates.

19. The method of claim 11, further comprising providing a negative photoresist layer between the first substrate and the second substrate.

20. The method of claim 18, wherein the negative photoresist layer is from approximately 0.05 microns to approximately 1 micron thick.

* * * * *